United States Patent Office 3,641,165
Patented Feb. 8, 1972

3,641,165
PREPARATION OF ALCOHOLS
Louis Schmerling, Riverside, and Robert A. Dombro, Chicago, Ill., assignors to Universal Oil Products Company, Des Plaines, Ill.
No Drawing. Continuation-in-part of application Ser. No. 668,693, Sept. 18, 1967. This application May 4, 1970, Ser. No. 34,538
Int. Cl. C07c 29/00
U.S. Cl. 260—618 R
9 Claims

ABSTRACT OF THE DISCLOSURE

A primary, secondary, or tertiary alcohol may be prepared by the hydrolysis of an aralkanesulfonic acid or salt thereof at elevated temperatures using an alcoholic alkali medium.

CROSS REFERENCE TO RELATED APPLICATIONS

This application is a continuation-in-part application of our co-pending application, Ser. No. 668,693, filed Sept. 18, 1967 and now Pat. No. 3,551,504.

SPECIFICATION

This invention relates to a process for preparing alcohols, and particularly to a process for preparing primary, secondary, and tertiary alcohols by utilizing a hydrocarbonsulfonic, and specifically an aralkanesulfonic acid or salt thereof as the starting material.

Alcohols, whether they be primary, secondary, or tertiary in nature, are important intermediates in the preparation of many chemical compounds. These alcohols may be arylsubstituted alkanols in configuration. For example, primary alcohols, and particularly those which contain a relatively long carbon chain to which is attached on aromatic nucleus, are utilized as intermediates in the preparation of synthetic detergents. These resulting detergents will be biodegradable in nature and therefore will find wide commercial aspects inasmuch as there exists a current problem of unwanted foams and suds in many rivers, streams, lakes, etc., which act as a water supply for many towns and cities. The presence of this unwanted foam is due in many instances to the use of detergents which are non-biodegradable in nature and which will not break down by bacterial action thereon. The non-biodegradable nature of these detergents is due to the fact that the alkyl side chain of the molecule is, in many instances, highly branched and therefore the organism which would ordinarily destroy the molecule cannot do so. In contradistincition to this, the use of straight-chain alkyl substituents on the ring will permit the detergents to be destroyed and therefore foam will not build up on the surface of the water. Aralkanols which contain shorter alkanol side chains are also useful in the chemical industry. For example, benzyl alcohol is useful as a solvent in perfumery and flavoring materials; as an intermediate in preparing other benzyl esters and ethers; as a high boiling solvent in cellulose derivative products; and in medicine as a local anesthetic. In addition, it may also be used as a solvent for cellulose esters and ethers, resins, lacquers, films, paint and varnish remover. Another important aralkanol is 2-phenylethanol which is used in organic synthesis, as an intermediate in perfumery, synthetic rose oil, cosmetics, soaps, flavors, preservatives, etc. Likewise, 3-phenylpropanol which is also known as hydrocinnamic alcohol is used in perfumery.

Heretofore, the prior art has disclosed the reaction of alkanesulfonic acids at elevated temperatures in aqueous alkali solutions. Three reactions were postulated as to what should occur when a sodium alkanesulfonate was heated with aqueous sodium hydroxide. These reactions are as follows:

(1) $RCH_2CH_2SO_3Na + NaOH \rightarrow RCH=CH_2 + NaHSO_3$ (2) $RCH_2CH_2SO_3Na + NaOH \rightarrow RCH_2CH_3 + Na_2SO_4$ (3) $RCH_2CH_2SO_3Na + NaOH \rightarrow RCH_2CH_2OH + Na_2SO_3$ It is reported in the prior art that when a-alkanesulfonates ranging from methane to hexane sulfonate were heated with aqueous sodium hydroxide at a temperature ranging from about 317° to about 375° C. neither olefin nor alcohol was obtained. In addition, acidification of the solutions resulting from sodium butane- and pentanesulfonates gave odors of butryic and valeric acids which were not isolated. Subsequently it was reported that repetition of this prior art reaction showed that the action of aqueous sodium hydroxide on the alkanesulfonates at 350° C. results exclusively in a bimolecular $\beta$-elimination reaction with the formation of the olefin, that is Equation 1 above; the first investigator had evidently overlooked the olefin due to his method of analysis of the product. However, in contradistinction to the reported results set forth in the prior art, the utilization of an alcoholic alkali medium in the hydrolysis of an aralkanesulfonic acid will result in the formation of an alcohol, rather than an olefin as the chief component of the reaction product.

It is, therefore, an object of this invention to provide a process for preparing alcohols.

A further object of this invention is to provide a process for preparing alcohols utilizing a hydrocarbonsulfonic acid, and particularly an aralkanesulfonic acid or salt thereof as a starting material.

In one aspect, an embodiment of this invention resides in a process for the preparation of an alcohol which comprises subjecting an aralkanesulfonic acid or an alkali, alkaline earth or Group III metal salt thereof to hydrolysis, at a temperature in the range of from about 100° to about 300° C. and a pressure sufficient to maintain a major portion of the reactants in the liquid phase, in an alcoholic alkali medium containing from about 10 to about 70 weight percent of alkali selected from the group consisting of alkali metal hydroxides and alkaline earth metal hydroxides, the alcoholic portion of said medium being selected from the group consisting of anhydrous lower alkanols and aqueous lower alkanols containing up to about 50% water, and recovering the resultant alcohol.

A specific embodiment of this invention is found in a in a process for the preparation of an alcohol which comprises subjecting phenylmethanesulfonic acid to hydrolysis at a temperature in the range from about 100° to about 300° C. and a pressure sufficient to maintain a major portion of the reactants in the liquid phase in the presence of a medium comprising a sodium hydroxide-ethyl alcohol solution and recovering the resultant benzyl alcohol.

Other objects and embodiments will be found in the following further detailed description of the present invention.

As hereinbefore set forth the present invention is concerned with a process for preparing alcohols utilizing an aralkanesulfonic acid as the starting material. The alcohol is prepared by subjecting the aforementioned aralkanesulfonic acid to hydrolysis in the presence of an alcoholic alkali medium at elevated temperatures ranging from about 100° up to about 300° C. In addition, it is also contemplated that the hydrolysis conditions will include pressures of about atmospheric. However, if so desired, superatmospheric pressures ranging from 2 to about 50 atmospheres or more may be used, said pressure being the pressure generated by the reactants at the reaction temperature or that effected by the introduction of a substantially inert gas such as nitrogen into the reaction vessel.

Examples of hydrocarbonsulfonic acids which are to be utilized as the starting material in the process of this invention include, in particular, aralkanesulfonic acids and alkali, alkaline earth or Group III metal salts thereof. Specific examples of these compounds will include phenylmethanesulfonic acid,
2-phenylethanesulfonic acid,
3-phenylpropanesulfonic acid,
4-phenylbutanesulfonic acid,
5-phenylpentanesulfonic acid,
6-phenylhexanesulfonic acid,
7-phenylheptanesulfonic acid,
8-phenyloctanesulfonic acid,
9-phenylnonanesulfonic acid,
10-phenyldecanesulfonic acid,
11-phenylundecanesulfonic acid,
12-phenyldodecanesulfonic acid, etc.,
o-tolylmethanesulfonic acid,
m-tolylmethanesulfonic acid,
p-tolylmethanesulfonic acid,
2-(o-tolyl)ethanesulfonic acid,
2-(m-tolyl)ethanesulfonic acid,
2-(p-tolyl)ethanesulfonic acid,
3-(o-tolyl)propanesulfonic acid,
3-(m-tolyl)propanesulfonic acid,
3-(p-tolyl)propanesulfonic acid, etc.,
sodium phenylmethanesulfonate,
sodium 3-phenylpropanesulfonate,
sodium 5-phenylpentanesulfonate,
sodium 7-phenylheptanesulfonate,
sodium 9-phenylnonanesulfonate,
sodium 11-phenylundecanesulfonate,
sodium o-tolylmethanesulfonate,
sodium p-tolylmethanesulfonate,
sodium 2-(m-tolyl)ethanesulfonate,
sodium 3-(o-tolyl)propanesulfonate,
sodium 3-(p-tolyl)propanesulfonate,
potassium 2-phenylethanesulfonate,
potassium 4-phenylbutanesulfonate,
potassium 6-phenylhexanesulfonate,
potassium 8-phenyloctanesulfonate,
potassium 10-phenyldecanesulfonate,
potassium 12-phenyldodecanesulfonate,
potassium m-tolylmethanesulfonate,
potassium 2-(o-tolyl)ethanesulfonate,
potassium 2-(p-tolyl)ethanesulfonate,
potassium 3-(m-tolyl)propanesulfonate,
calcium phenylmethanesulfonate,
calcium 3-phenylpropanesulfonate,
calcium 5-phenylpentanesulfonate,
calcium 7-phenylheptanesulfonate,
calcium 9-phenylnonanesulfonate,
calcium 11-phenylundecanesulfonate,
calcium o-tolylmethanesulfonate,
calcium p-tolylmethanesulfonate,
calcium 2-(m-tolyl)ethanesulfonate,
calcium 3-(o-tolyl)propanesulfonate,
calcium 3-(p-tolyl)propanesulfonate,
magnesium 2-phenylethanesulfonate,
magnesium 4-phenylbutanesulfonate,
magnesium 6-phenylhexanesulfonate,
magnesium 8-phenyloctanesulfonate,
magnesium 10-phenyldecanesulfonate,
magnesium 12-phenyldodecanesulfonate,
magnesium m-tolylmethanesulfonate,
magnesium 2-(o-tolyl)ethanesulfonate,
magnesium 2-(p-tolyl)ethanesulfonate,
magnesium 3-(m-tolyl)propanesulfonate,
aluminum phenylmethanesulfonate, etc.

In general compounds in which the sulfur is attached to a primary (e.g., those above listed) or secondary carbon atom (e.g., 1-arylalkanesulfonic acids and salts) are the preferred sulfonic acids or salts thereof. Compounds in which the sulfur is attached to a tertiary carbon atom (e.g., 1-aryl-1-alkylalkanesulfonic acids and salts thereof) may also be used, but not necessarily with equivalent results. It is to be understood that the aforementioned substituted sulfur containing compounds are only representatives of the class of compounds which may undergo hydrolysis in an alcoholic alkali medium, and that the present invention is not necessarily limited thereto.

It is also contemplated within the scope of this invention that hydrocarbonsulfinic and hydrocarbonsulfenic acids and salts thereof which are similar in configuration to the aforementioned hydrocarbonsulfonic acids and salts thereof may also be used in the present invention. However, the hydrocarbonsulfonic acids or salts thereof constitute the preferred reactants inasmuch as these compounds are more readily available and correspondingly more inexpensive than are the hydrocarbonsulfenic and hydrocarbonsulfinic acids and salts thereof.

The alcoholic alkali medium in which the process of this invention is effected comprises a mixture of an alcohol, water and an alkali compound such as sodium hydroxide, lithium hydroxide, rubidium hydroxide, cesium hydroxide, magnesium hydroxide, calcium hydroxide, strontium hydroxide, etc., the hydroxides being present in the mixture in an amount in the range of from about 10 wt. percent up to about 70 wt. percent; in general, hydroxides which are soluble in alcohol or aqueous alcohol are preferred. The alcoholic portion of the medium is provided for by the presence of methyl alcohol, ethyl alcohol, n-propyl alcohol, isopropyl alcohol, butyl alcohol, etc., the preferred alcohol being ethyl alcohol. The alcohol may contain up to about 50% of water, water being particularly useful in causing more rapid and complete solution of the hydroxide.

The process of this invention may be effected in any suitable manner and may comprise either a batch or continuous type operation. For example, when a batch type operation is used, a quantity of the sulfonic acid or salt thereof is placed in an appropriate reaction apparatus. The alcoholic or aqueous-alcoholic alkali medium is also added to the reaction vessel which is thereafter heated to the desired operating temperature. The reaction is allowed to proceed at the desired temperature for a predetermined period of time which may range from about 0.5 up to about 10 hours or more. In addition, if so desired, when utilizing an apparatus such as a rotating autoclave, the reaction may be effected under a pressure which is provided for by the introduction of an inert gas such as nitrogen to the reaction apparatus. Upon completion of the desired residence time the apparatus and contents thereof are allowed to cool to room temperature. In the event that the reaction has been run under superatmospheric pressure any excess pressure that may be present is vented and the reaction mixture is recovered. The reaction product is then treated in a conventional manner such as fractional distillation, crystallization or other separation means whereby the desired alcohol which may be primary, secondary, or tertiary in nature is recovered from the reaction mixture, the latter comprising unreacted sulfur containing compounds, by-product and alcoholic alkali medium.

It is also contemplated within the scope of this invention that the process may be effected in a continual manner. The sulfonic acid or salt thereof is continuously charged to a reaction vessel which is maintained at the proper operating conditions of temperature and pressure. The alcoholic or aqueous-alcoholic alkali medium is also continuously charged thereto through separate means, having been premixed prior to entry into said reactor. Alternatively, an aqueous alkali solution and the alcohol may be charged to the reactor through separate lines or, if so desired, one or both may be admixed with the sulfonic acid or salt thereof prior to entry into said reactor and the mixture charged thereto in a single stream. After a predetermined residence time has elapsed, the reactor effluent is continuously discharged from the reaction zone and subjected to a separation step whereby the desired alcohol is separated from unreacted charge stock, alcoholic alkali medium and any by-product which may have formed, the former two components being recycled to the reaction zone to form a portion of the feed stock.

The following examples are given to illustrate the process of the present invention. They are not, however, intended to limit the generally broad scope of the present invention in strict accordance therewith.

EXAMPLE I

A mixture of 0.1 mole of phenylmethanesulfonic acid, 0.2 mole of potassium hydroxide and 150 cc. of ethyl alcohol is placed in a glass liner of a rotating autoclave which is thereafter sealed and nitrogen is pressed in until an initial pressure of 25 atmospheres is reached. The autoclave is then heated to a temperature of about 150° C. and maintained at a temperature ranging from 150° to 200° C. for a period of 5 hours. At the end of this time, the autoclave and contents thereof are allowed to cool to room temperature, and the excess pressure is discharged. The reaction product is removed from the autoclave and the unreacted phenylmethanesulfonic acid is separated from the reaction mixture. The solvent is removed by distillation, and the residue is diluted with water. The alkaline solution is extracted with ether, following which the ether is removed by means of a vacuum and the residue is fractionated by distillation. The desired product comprising benzyl alcohol is recovered by this means of distillation.

EXAMPLE II

In this example a mixture of 0.1 mole of sodium phenylmethanesulfonate, 0.2 mole of sodium hydroxide and 150 cc. of absolute ethyl alcohol is placed in the glass liner of a rotating autoclave which is thereafter sealed and nitrogen pressed in until an initial pressure of 30 atmospheres is reached. The autoclave is then heated to a temperature of 150° C. and maintained in a range of from 150° to 200° C. for a period of 5 hours. At the end of this time, heating is discontinued, the autoclave is allowed to return to room temperature, and the excess pressure is discharged. The autoclave is opened, the reaction product is recovered, and the unreacted sodium phenylmethanesulfonate is filtered off. The filtrate is then subjected to distillation to remove the ethyl alcohol solvent, the residue is diluted with water and extracted with ether. Thereafter, the ether is removed in vacuo. The residue is fractionated by distillation and analysis of certain fractions by means of gas-liquid chromatography (GLC), nuclear magnetic resonance (NMR), and infra-red (IR) will disclose the presence of benzyl alcohol.

EXAMPLE III

A mixture consisting of 0.05 mole of 2-phenylethanesulfonic acid, 0.2 mole of sodium hydroxide and 150 cc. of an equeous alcoholic solution containing 90 wt. percent of n-propyl alcohol and 10 wt. percent of water is placed in a glass liner of a rotating autoclave. The autoclave is sealed, nitrogen is pressed in until an initial operating pressure of 30 atmospheres is reached. Thereafter the autoclave and contents thereof are heated to a temperature of 150° C. and maintained at a range of from 150° to 200° C. for a period of 5 hours. Following the completion of the desired residence time, the autoclave and contents thereof are allowed to return to room temperature, the excess pressure is discharged, and the reaction product is recovered. The unreacted 2 - phenylethanesulfonic acid is separated by means of filtration and the filtrate is distilled to remove the propyl alcohol. The residue from this distillation is diluted with water and extracted with ether. The extract is separated and the ether is removed by vacuum. Fractional distillation of the residue will result in the recovery of the desired product which is 2-phenylethanol.

EXAMPLE IV

In this example, a mixture consisting of 0.1 mole of potassium 3-phenylpropanesulfonate, 0.2 mole of sodium hydroxide and 150 cc. of an aqueous alcoholic solution comprising 91 wt. percent ethyl alcohol and 9 wt. percent of water is placed in a glass liner of a rotating autoclave, the autoclave is sealed, nitrogen pressed in until an initial operating pressuring of 25 atmospheres is reached, and the autoclave thereafter is heated to a temperature of 150° C. After maintaining the autoclave at a temperature ranging from 150° to 200° C. for a period of 5 hours, heating is discontinued. After returning to room temperature, the excess pressure is discharged and the reaction product is recovered. The unreacted potassium 3-phenylpropanesulfonate is filtered off and the filtrate is treated in a manner similar to that set forth in Example I above. Analysis of the product will disclose the presence of 3-phenylpropanol.

EXAMPLE V

A mixture of 0.1 mole of magnesium 5-phenylpentanesulfonate, 0.2 mole of potassium hydroxide and 150 cc. of absolute ethyl alcohol is placed in the glass liner of a rotating autoclave. The mixture is then treated in a manner similar to that set forth in the above examples, namely, by subjecting the mixture to operating conditions which include a pressure of 30 atmospheres, a temperature in the range of from 150° to 200° C., and a residence time of 5 hours. The reacted product is recovered and also treated in a manner similar to that hereinbefore set forth. Analysis of the distillation fraction by means of GLC, NMR, and IR will disclose the presence of 5-phenylpentanol.

We claim as our invention:

1. A process for the preparation of an alcohol which comprises subjecting an aralkanesulfonic acid or an alkali, alkaline earth or Group III metal salt thereof to hydrolysis, at a temperature in the range of from about 100° to about 300° C. and a pressure sufficient to maintain a major portion of the reactants in the liquid phase, in an alcoholic alkali medium containing from about 10 to about 70 weight percent of alkali selected from the group consisting of alkali metal hydroxides and alkaline earth metal hydroxides, the alcoholic portion of said medium being selected from the group consisting of anhydrous lower alkanols and aqueous lower alkanols containing up to about 50% water, and recovering the resultant alcohol.

2. The process as set forth in claim 1 in which said alcoholic alkali medium is a sodium hydroxide-ethyl alcohol solution.

3. The process as set forth in claim 1 in which said alcoholic alkali medium is a sodium hydroxide-propyl alcohol solution.

4. The process as set forth in claim 1 in which said alcoholic alkali medium is a potassium hydroxide-ethyl alcohol solution.

5. The process as set forth in claim 1 in which said aralkanesulfonic acid is phenylmethanesulfonic acid and the resultant alcohol is benzyl alcohol.

6. The process as set forth in claim 1 in which said alkali metal salt of said aralkanesulfonic acid is sodium phenylmethanesulfonate and said resultant alcohol is benzyl alcohol.

7. The process as set forth in claim 1 in which said aralkanesulfonic acid is 2-phenylethanesulfonic acid and said resultant alcohol is 2-phenylethanol.

8. The process as set forth in claim 1 in which said alkali metal salt of said aralkanesulfonic acid is potassium 3-phenylpropanesulfonate and said resultant alcohol is 3-phenylpropanol.

9. The process as set forth in claim 1 in which said alkaline earth metal salt of said aralkanesulfonic acid is magnesium 5-phenylpentanesulfonate and said resultant alcohol is 5-phenylpentanol.

References Cited
UNITED STATES PATENTS

| 2,553,576 | 5/1951 | Grosse et al. | 260—632 R |
| 3,551,504 | 12/1970 | Schmerling et al. | 260—618 R X |

BERNARD HELFIN, Primary Examiner